United States Patent
Chowdhury et al.

(10) Patent No.: US 10,571,290 B2
(45) Date of Patent: Feb. 25, 2020

(54) METHOD AND SYSTEM FOR VEHICLE SPEED PROFILE GENERATION

(71) Applicant: Tata Consultancy Services Limited, Mumbai (IN)

(72) Inventors: Arijit Chowdhury, Kolkata (IN); Tapas Chakravarty, Kolkata (IN); Tanushree Banerjee, Kolkata (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 240 days.

(21) Appl. No.: 15/650,454

(22) Filed: Jul. 14, 2017

(65) Prior Publication Data

US 2018/0017402 A1 Jan. 18, 2018

(30) Foreign Application Priority Data

Jul. 15, 2016 (IN) .............................. 201621024234

(51) Int. Cl.
*G01C 21/34* (2006.01)
*G08G 1/0967* (2006.01)

(52) U.S. Cl.
CPC ..... *G01C 21/3492* (2013.01); *G01C 21/3484* (2013.01); *G08G 1/096716* (2013.01); *B60W 2720/103* (2013.01)

(58) Field of Classification Search
None
See application file for complete search history.

(56) References Cited

U.S. PATENT DOCUMENTS

| 8,634,822 | B2 | 1/2014 | Silver et al. |
| 2011/0267185 | A1* | 11/2011 | Zhang ................... G07C 5/008 340/437 |
| 2013/0184928 | A1 | 7/2013 | Kerkhof et al. |
| 2014/0148972 | A1 | 5/2014 | Basir et al. |

FOREIGN PATENT DOCUMENTS

EP 1529695 B1 * 6/2007 ......... B60K 31/0008

OTHER PUBLICATIONS

Toledo, T. et al. (2006). "In-Vehicle Data Recorder for Evaluation of Driving Behavior and Safety," *Transportation Research Record: Journal of the Transportation Research Board*, pp. 112-119.

* cited by examiner

*Primary Examiner* — Abdhesh K Jha
(74) *Attorney, Agent, or Firm* — Finnegan, Henderson, Farabow, Garrett & Dunner LLP

(57) ABSTRACT

A method and system is provided for vehicle speed profile generation. The method is performed by receiving data pertaining to driver characteristics and characteristics of trips taken by said driver, creating driver profile by generating skill and aggression parameters for said driver, constructing trip parameters pertaining to said trips taken by the driver by processing the skill and aggression parameters, constructing acceleration dataset for said trips, constructing speed values from the acceleration dataset and processing the speed values for anomalies.

16 Claims, 3 Drawing Sheets

METHOD AND SYSTEM FOR VEHICLE SPEED PROFILE GENERATION

PRIORITY CLAIM

This U.S. patent application claims priority under 35 U.S.C. § 119 to: India Application No. 201621024234, filed on Jul. 15, 2016. The entire contents of the aforementioned application are incorporated herein by reference.

TECHNICAL FIELD

This disclosure relates generally to synthetic data generation, and more particularly to a method and system for vehicle speed profile generation.

BACKGROUND

Currently there are different analytics solutions to perform diagnostics on acquired data from vehicles. Also such systems can record and playback and offer data logging with real-time signal views.

Prior art illustrates an intuitive and user friendly introduction to vehicle dynamics simulation and virtual test driving personal computers. But such solutions are mostly purely analytics platform, not made for simulation of the acquired data and synthetic data generation from as a result of such simulation.

On the other hand vehicle model based simulations are used by car manufacturers for testing vehicle model concept, but these models are not suitable to generate large scale vehicle data. Thus a system or model which offers large scale data generation of vehicle data is not targeted as much as it should and existing solutions are not robust and specific. Thereby, generating synthetic data in the form of a vehicle's speed profile from the acquired data of vehicles is still considered to be one of the biggest challenges of the technical domain.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present disclosure envisages a method and system which can generate a vehicle's speed profile.

In an embodiment of the invention, a method for vehicle speed profile generation is provided. The method comprises processor implemented steps of receiving data pertaining to driver characteristics and characteristics of trips taken by said driver, creating driver profile by generating skill and aggression parameters for said driver, constructing trip parameters pertaining to said trips taken by the driver by processing the skill and aggression parameters, constructing acceleration dataset for said trips, constructing speed values from the acceleration dataset and processing the speed values for anomalies.

In another embodiment of the invention, a system for vehicle speed profile generation is provided. The system comprises of a processor, a data bus coupled to the processor and a computer-usable medium embodying computer code, wherein the computer-usable medium is coupled to the data bus and the computer program code comprising instructions executable by said processor and configured for operating a data reception module (202) adapted for receiving data pertaining to driver characteristics and characteristics of trips taken by said driver, a driver profile generator module (204) adapted for creating driver profile by generating skill and aggression parameters for said driver, a trip identifier module (206) adapted for constructing parameters pertaining to said trips taken by the driver by processing the skill and aggression parameters, an acceleration generator (208) module adapted for constructing acceleration data for said trips, a speed generator module (210) adapted for obtaining speed values from the acceleration data and a validation module (212) adapted for processing the speed values for anomalies.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
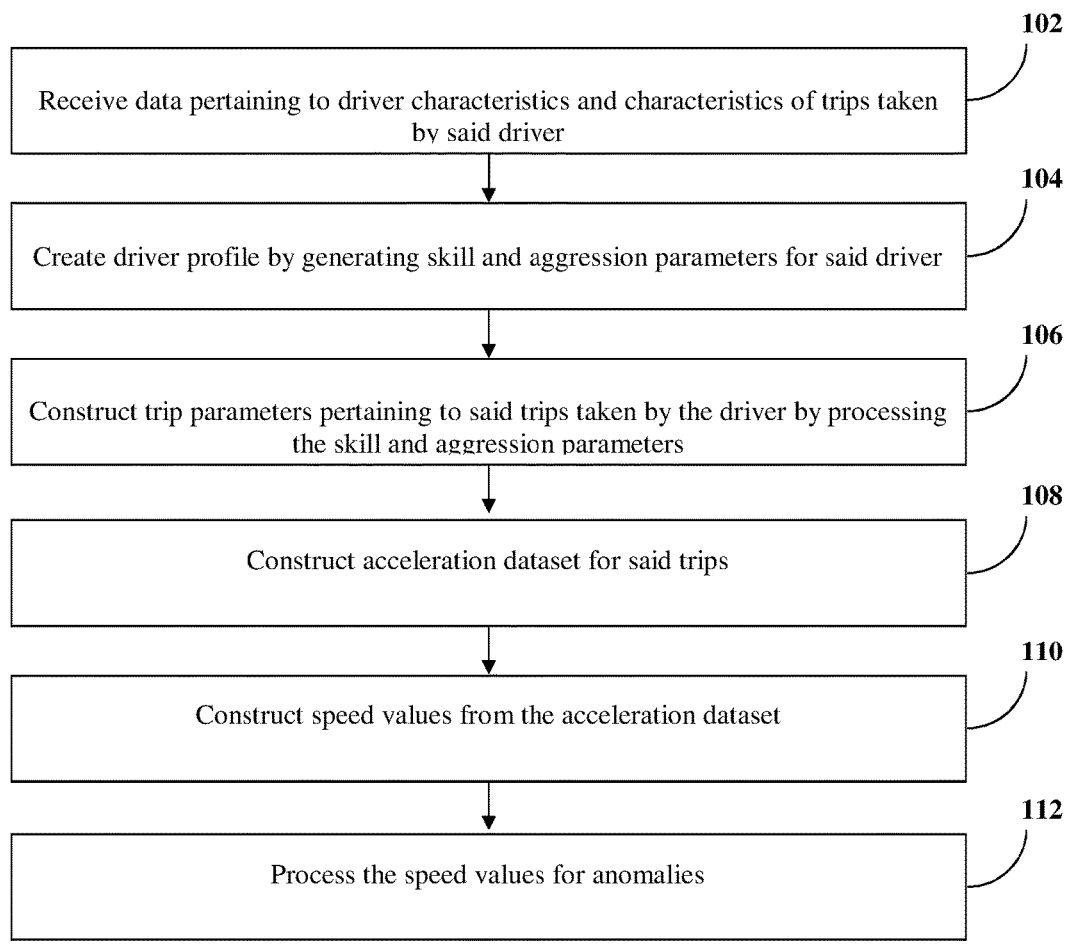
FIG. 1 shows a flow chart illustrating method for vehicle speed profile generation.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by a processor or any other hardware entity.

The disclosed embodiments are merely exemplary of the invention, which may be embodied in various forms.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the natural disaster prediction system and method may be stored on, distributed across, or read from other machine-readable media.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

The present disclosure provides a method and system for vehicle speed profile generation.

Referring to FIG. 1, it is a flow chart illustrating method for vehicle speed profile generation.

The process starts at step 102, data pertaining to driver characteristics and characteristics of trips taken by said driver is received. At step 104, driver profile is created by generating skill and aggression parameters for said driver. At step 106, trip parameters pertaining to said trips taken by the driver by processing the skill and aggression parameters are constructed. At step 108, acceleration dataset for said trips are constructed. At step 110, speed values are constructed from the acceleration dataset and at step 112, the speed values are processed for anomalies.

Figure 2:
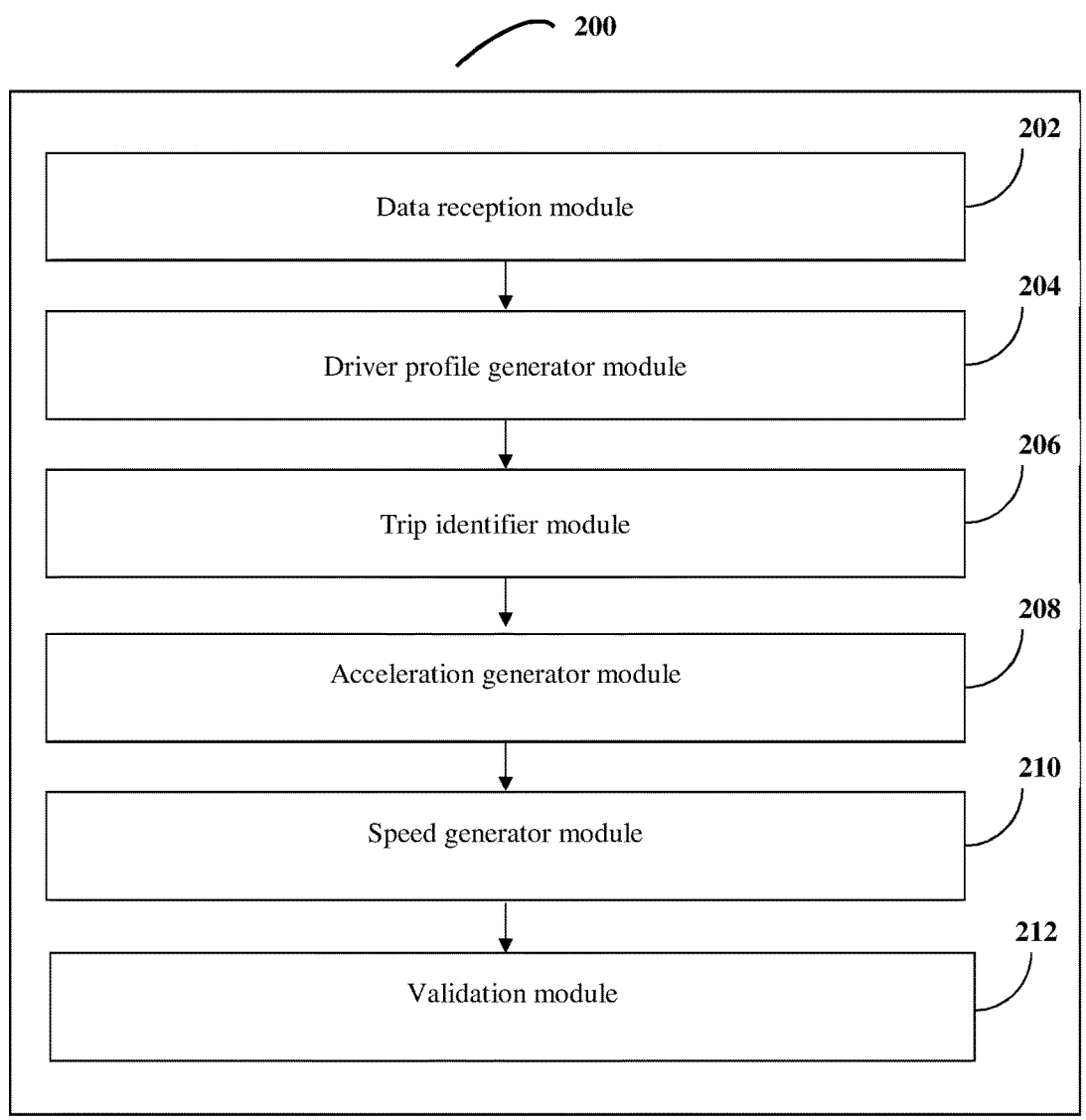
FIG. 2 shows a block diagram of a system for vehicle speed profile generation.

Referring to FIG. 2, it is a block diagram of a system for vehicle speed profile generation. The system comprises of a data reception module (202) adapted for receiving data pertaining to driver characteristics and characteristics of trips taken by said driver, a driver profile generator module (204) adapted for creating driver profile by generating skill and aggression parameters for said driver, a trip identifier module (206) adapted for constructing trip parameters pertaining to said trips taken by the driver by processing the skill and aggression parameters, an acceleration generator module (208) adapted for constructing acceleration dataset for said trips, a speed generator module (210) adapted for constructing speed values from the acceleration dataset and a validation module (212) adapted for processing the speed values for anomalies.

In an embodiment of the present invention, the data pertaining to driver characteristics and characteristics of trips taken by said driver are selected from a group comprising of type of driver, average trip length, number of trips per driver, trip geographical details, vehicle type and road type.

In another embodiment of the present invention, the type of driver is selected from a group comprising of novice, cautious, risky and rival; the trip geographical details are obtained from a group comprising of climate, traffic situation and time; the vehicle type is selected from a group comprising of small car, sedan and SUV, wherein the vehicle type is selected as sedan by default; the road type is selected from a group comprising of very bad, bad, average, good and very good.

In another embodiment of the present invention, a trip is a continuous journey segment of duration T and location is used to generate data specific to that locations driving pattern. Typically a city (e.g. New York) is location. Driving data is location specific and depends on locality.

In another embodiment of the present invention, in the driver profile generator module (204), driver behavior modeling is specific to a peer group and not absolute. For a group of driver and each driver having multitude of trips his behavior is identified as follows.

i. For each completed trip kurtosis, the normalized fourth order moment about mean of longitudinal acceleration, is computed.

ii. Now for each driver there is a collection of kurtosis values.

Number of kurtosis values for a driver is equal to the number of trips taken by him.

iii. For each driver σ and μ are computed, wherein
σ=standard deviation of kurtosis values of longitudinal acceleration for a driver
μ=mean of kurtosis values of longitudinal acceleration for a driver Skill Score Absolute (SSA)=1/σ

Aggression Score Absolute (ASA)=μ iv. For each driver there is a SSA and ASA. Using these values we compute Local Skill (LS) Coefficients and Local Aggression (LA) Coefficients.

LS Coefficient=mean of SSA, standard deviation of SSA

LA Coefficient=mean of ASA, standard deviation of ASA

A table for these values which is learnt from real data is kept in database for each location types.

v. For each driver Relative Skill Score (RSS) and Relative Aggression Score (RAS) are computed as follows $$RSS = \frac{SSA - \text{mean of } SSA}{\text{standard deviation of } SSA}$$

$$RAS = \frac{RAS - \text{mean of } RAS}{\text{standard deviation of } RAS}$$

In an exemplary embodiment of the present invention, In a group of drivers as shown in a scatter plot in accordance with FIG. 1, it gives a visual representation of skill and aggression. High skill score (RSS) means driver have more skill and high aggression score (RAS) means driver is more aggressive. Since the data is normalized the plot is centered on origin (0, 0) in a 2-D plane, referred as skill-aggression plane. Out of all data points 50% of entire data (i.e. no. of drivers) centered around origin are categorized as normal. A circle with origin as center is drawn so that 50% of all drivers fall inside the circle. The radius of the drawn circle varies based on geography. Those radii are stored for all geography. Remaining drivers (points) are classified as follows:

a) Novice: low skill and low aggression.
b) Cautious: high skill and low aggression
c) Risky: low skill and high aggression d) Rival: high skill and high aggression Based on Skill and Aggression 5 driver type exists. The data reception module (202) comes with number of drivers, number of trips per driver, driver type etc. For a specified driver type a point is selected in the corresponding region in skill-aggression plane. The radius of circle, LS Coefficient and LA Coefficient are taken from database based on specified geography. Then for each driver there is a specific value of mean and standard deviation of kurtosis. Normal random numbers are generated and each number corresponds to a trip. After that for each trip a collection of acceleration using Pearson type VII distribution is generated. Kurtosis, geography and driver type are taken as input. Next, the speed generator module (210) creates speed profile for each set of acceleration.

In another embodiment of the present invention, the driver profile generator module (204) has a Skill and Aggression quantifier which generates a normalized skill and aggression value set for each driver. For example let a driver is of type normal. Then for this driver a skill and aggregation parameters are generated. Generation of these two numbers for each driver is done by this module. These values are normalized values. After this step each driver has a pair of mean and standard deviation of kurtosis values.

In another embodiment of the present invention, in the trip identifier module (206), two functionalities take place—parameter denormalization and trip level parameter construction. For parameter denormalization, mean and standard deviation of kurtosis value for each driver is used to generate an actual (i.e. denormalized) value of mean and standard deviation ($\sigma_D$, $\mu_D$). These values are denormalized by using 'geography' parameter from data reception module (202).

$$\sigma_D = \sigma * C_{Geo}$$

$$\mu_D = \mu * C_{Geo}$$

where $C_{Geo}$ is the geography specific parameter obtained from database. For trip level parameter construction, generated pairs of ($\mu_D$, $\sigma_D$) for all drivers are taken and N normal random variables $N(\mu_D, \sigma_D)$ for each pair are generated. After this step N kurtosis values per driver are accumulated.

In another embodiment of the present invention, in the acceleration generator module (208), for M driver and N trips per driver, there will be MN values of kurtosis. For each driver N values of kurtosis and driving type is present. Based on this, the acceleration generator module (208) generates N set of acceleration values which follows Pearson type VII distribution. Geography and driver type is used to get input parameters for underlying Pearson type VII process. For each driver acceleration values are validated. Acceleration profile is compared with expected acceleration profile (i.e. probability density) of particular driver type. If they match acceleration profile is saved as a map with corresponding kurtosis value as key, where key is the map-pair.

In another embodiment of the present invention, in the speed generator module (210), set of acceleration values comes as input and speed time series data is generated as output. At first all acceleration values are portioned into 5 categories.
1. Normal($-1.2$ m/s^2 <value< $1.2$ m/s^2)
2. High ($2.77$ m/s^2 >=value>= $1.2$ m/s^2)
3. Low ($-2.77$ =<value=< $-1.2$ m/s^2)
4. Very high (value>= $2.77$ m/s^2)
5. Very Low (value=< $-2.77$ m/s^2)

Then these accelerations are stored in memory with their corresponding category. After that simulation for speed starts. Initially it starts with mode='start' as journey is starting. Once speed reaches 10 m/s mode is updated to 'steady'. There are 5 modes 'start', 'steady', 'stop', 'speed up', 'speed down'. At each mode; different no. acceleration values are taken (based on category given in table 1).

TABLE 1

Modes and Number of Samples

| Mode | No of samples (cycle length = l) | Category of acceleration |
|---|---|---|
| start | Randomly from 8 to 14 | Either normal positive or high. |
| steady | Randomly from 4 to 10 | Either positive or negative normal acceleration. |
| stop | Randomly from 8 to 14 | Either low or very low or negative acceleration |
| speed up | Randomly 2 to 5 | Very high |
| speed down | Randomly 2 to 5 | Very low |

Then from selected acceleration values speed is generated by taking a summation of acceleration samples. After that mode is updated by logical table 2.

TABLE 2

Modes and Number of Samples

| Mode (current cycle) | Next mode |
|---|---|
| start | if last speed sample >10 m/s steady else start |
| steady | Either steady, speed up, speed down |
| stop | Stop (unless speed = 0) |
| speed up | if last speed sample >17 m/s speed down else Steady or speed down |
| speed down | Steady or speed up or start(if last speed sample <.5 m/s) |

At any step if speed <0, then speed is set=0, remaining samples in that cycle are discarded and mode is changed to start.

In another embodiment of the present invention, generated speed time series is validated by the validation module (212) as per geography using boundary conditions for a drive in the following way:
   a) Speed profile: maximum speed, percentage of drive in high speed zone
   b) Time: day or night driving
   c) Distance (trip length)
   d) % Speed distribution: based on city or highway drive generated speed is checked for compliance with respect to standard drive cycle models for that geography.

If validation is not successful same set of accelerations are used again to generate speed values. Once validation is successful, speed values are passed to structured dataset creation module along with driver type, driver ID.

Impact of driving on driver's health is measured by health index which is a function of speed and acceleration profile as well as geography, drive condition. For each trip a health index is given in percentage where 100% means maximum stress level and 0% means no stress is present.

Figure 3:
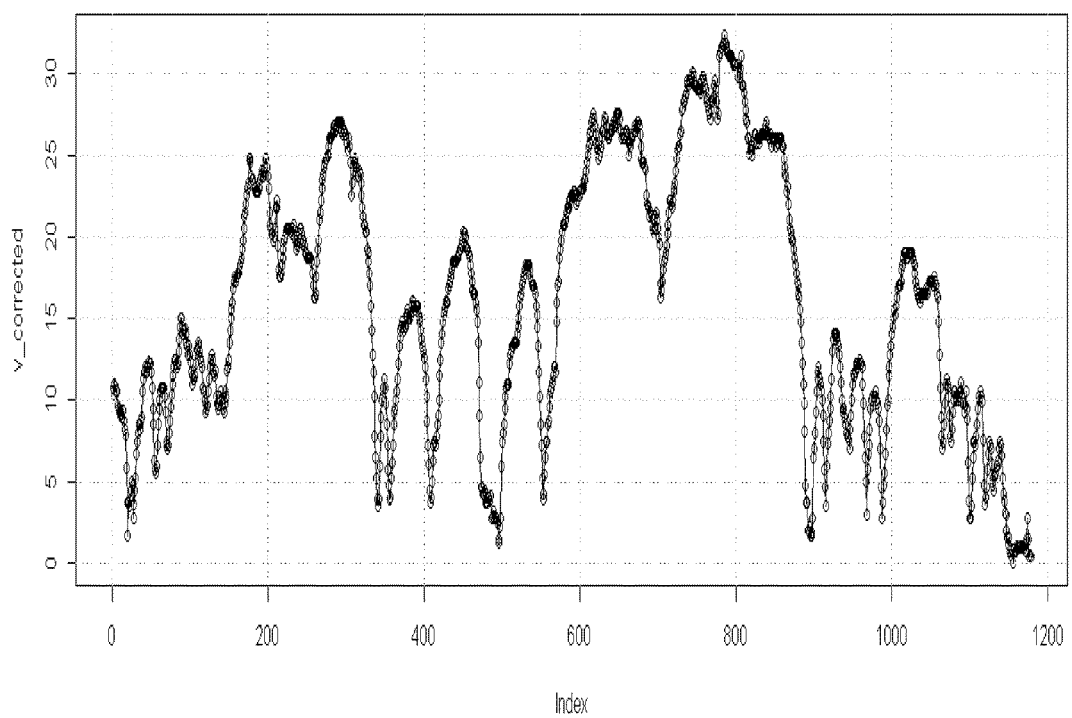
FIG. 3 shows the format of the resulting data stored in a structured database and presented to a user.

In another embodiment of the present invention, generated speed values are stored in a database in cloud or dedicated storage with driver ID, driver type and geography. For each created journey data this module adds a new journey in database. Thus after each speed time series creation generated speed data is stored in a structured database for corresponding driver. Once all the required data are created the link to updated generated data is given as output as shown in FIG. 3. From the link all or part of data as can be obtained as per requirement.

In an exemplary embodiment of the present invention, data as per FIG. 3 is stored in structured database and made available to a user using standard request or Application Programming Interface (API) call so that user can access it by requirement.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

What is claimed is:

1. A method for vehicle speed profile generation, said method implemented by a processor and comprising:
   receiving data pertaining to driver characteristics and characteristics of trips taken by said driver;
   creating driver profile by generating skill parameter and aggression parameter for said driver, wherein the skill parameter is a standard deviation of kurtosis values of longitudinal acceleration for all the trips taken by said driver and the aggression parameter is a mean of the kurtosis values of longitudinal acceleration for all the trips taken by said driver;
   constructing trip parameters pertaining to said trips taken by the driver by processing the skill parameter and aggression parameter;
   constructing acceleration dataset for said trips;
   constructing speed values from the acceleration dataset; and
   processing the speed values for anomalies.

2. The method as claimed in claim 1, wherein the data pertaining to driver characteristics and characteristics of trips taken by said driver are selected from a group comprising of type of driver, average trip length, number of trips per driver, trip geographical details, vehicle type and road type.

3. The method as claimed in claim 2, wherein the type of driver is selected from a group comprising of novice, cautious, risky and rival.

4. The method as claimed in claim 2, wherein the trip geographical details are selected from a group comprising of climate, traffic situation and time.

5. The method as claimed in claim 2, wherein the vehicle type is selected from a group comprising compact, sedan and SUV.

6. The method as claimed in claim 5, wherein the vehicle type is selected as sedan by default.

7. The method as claimed in claim 1, wherein one parameter for each said trip is generated by processing the skill parameter and aggression parameter.

8. The method as claimed in claim 1, wherein the method of constructing said acceleration dataset is based on Pearson Type VII distribution.

9. The method as claimed in claim 1, wherein speed values are processed for anomalies and subsequent validation before selection of said speed values.

10. The method as claimed in claim 9, wherein speed values are reprocessed if validation of said speed values results in failure.

11. A system for vehicle speed profile generation, said system comprising:
    a processor;
    a data bus coupled to said processor; and
    a non-transitory computer-readable medium embodying computer code, said computer-readable medium being coupled to said data bus, said computer program code comprising instructions executable by said processor and configured to:
    receive data pertaining to driver characteristics and characteristics of trips taken by said driver;
    create driver profile by generating skill parameter and aggression parameter for said driver, wherein the skill parameter is a standard deviation of kurtosis values of longitudinal acceleration for all the trips taken by said driver and the aggression parameter is a mean of the kurtosis values of longitudinal acceleration for all the trips taken by said driver;
    construct trip parameters pertaining to said trips taken by the driver by processing the skill parameter and aggression parameter;
    construct acceleration dataset for said trips;
    construct speed values from the acceleration dataset; and
    process the speed values for anomalies.

12. The system of claim 11, wherein the trip geographical details are selected from a group comprising of climate, traffic situation and time.

13. The system of claim 11, wherein the vehicle type is selected from a group comprising compact, sedan and SUV.

14. The system of claim 11, wherein the vehicle type is selected as sedan by default.

15. One or more non-transitory machine readable information storage mediums comprising one or more instructions which when executed by one or more hardware processors causes the one or more hardware processor to perform a method for vehicle speed profile generation, said method comprising:
    receiving data pertaining to driver characteristics and characteristics of trips taken by said driver;
    creating driver profile by generating skill parameter and aggression parameter for said driver, wherein the skill parameter is a standard deviation of kurtosis values of longitudinal acceleration for all the trips taken by said driver and the aggression parameter is a mean of the kurtosis values of longitudinal acceleration for all the trips taken by said driver;
    constructing trip parameters pertaining to said trips taken by the driver by processing the skill parameter and aggression parameter;
    constructing acceleration dataset for said trips;
    constructing speed values from the acceleration dataset; and
    process the speed values for anomalies.

16. The one or more non-transitory machine readable information storage mediums of claim 15, wherein the type of driver is selected from a group comprising of novice, cautious, risky and rival.

\* \* \* \* \*